No. 813,916. PATENTED FEB. 27, 1906.
H. B. ROBISCHUNG.
BRAKE BEAM.
APPLICATION FILED OCT. 30, 1905.

2 SHEETS—SHEET 1.

Witnesses:
G. A. Pennington
B. F. Funk

Inventor:
Henry B. Robischung,
by Bakewell & Cornwall
Attys

No. 813,916. PATENTED FEB. 27, 1906.
H. B. ROBISCHUNG.
BRAKE BEAM.
APPLICATION FILED OCT. 30, 1905.

2 SHEETS—SHEET 2.

Witnesses
A. J. McCauley
Nells L. Church

Inventor:
Henry B. Robischung
by Bakewell & Cornwall Atty's.

UNITED STATES PATENT OFFICE.

HENRY B. ROBISCHUNG, OF KALAMAZOO, MICHIGAN, ASSIGNOR TO CHICAGO RAILWAY EQUIPMENT COMPANY, OF CHICAGO, ILLINOIS, A CORPORATION OF ILLINOIS.

BRAKE-BEAM.

No. 813,916.     Specification of Letters Patent.     Patented Feb. 27, 1906.

Application filed October 30, 1905. Serial No. 285,037.

*To all whom it may concern:*

Be it known that I, HENRY B. ROBISCHUNG, a citizen of the United States, residing at the city of Kalamazoo, county of Kalamazoo, State of Michigan, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1:
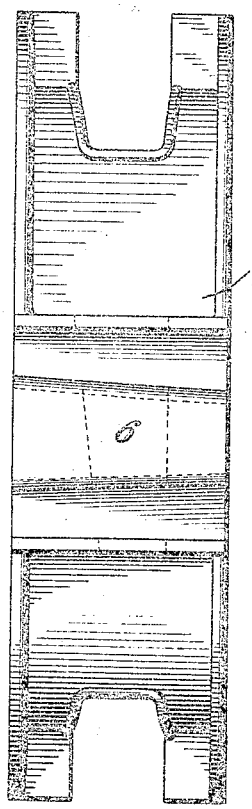
Figure 3:
Figure 4:
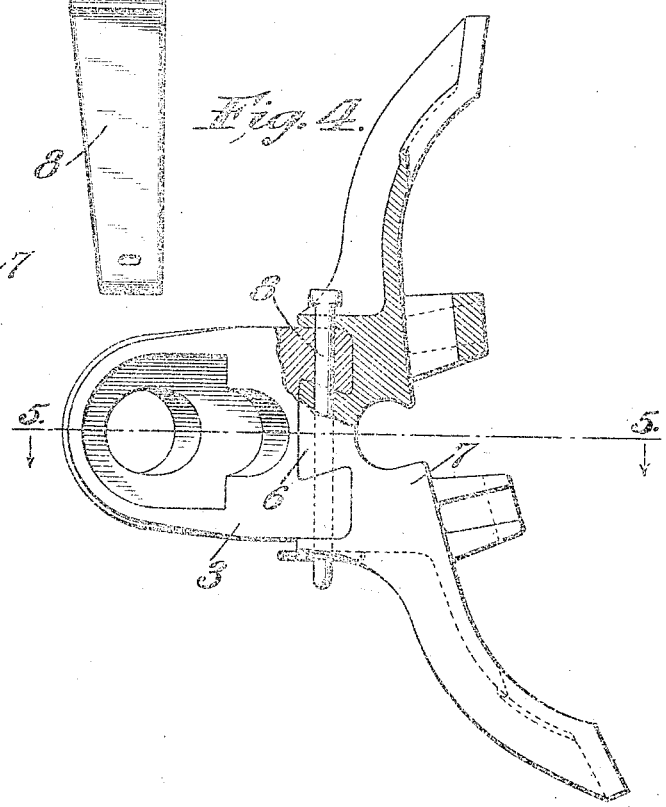
Figure 2:
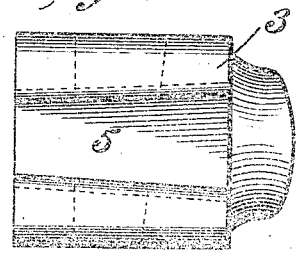
Figure 5:
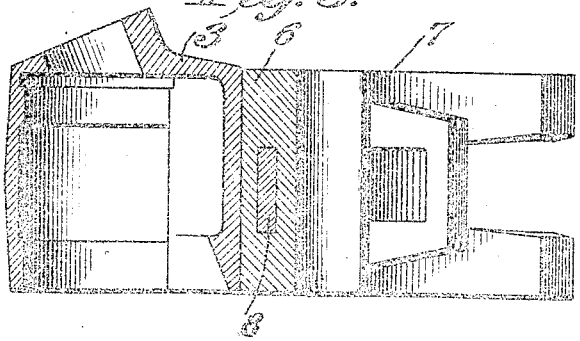
Figure 6:
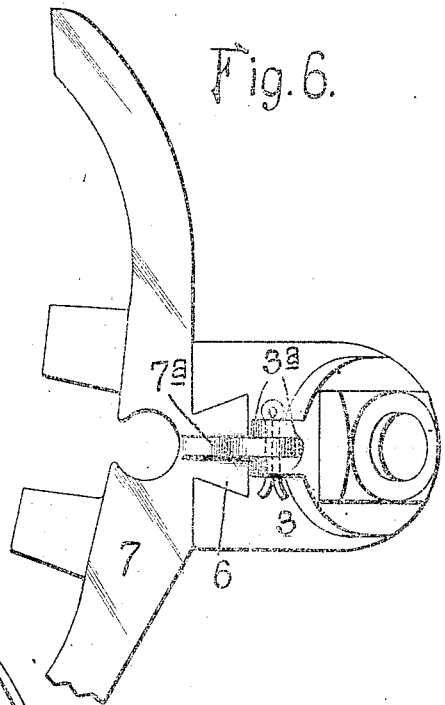
Figure 7:
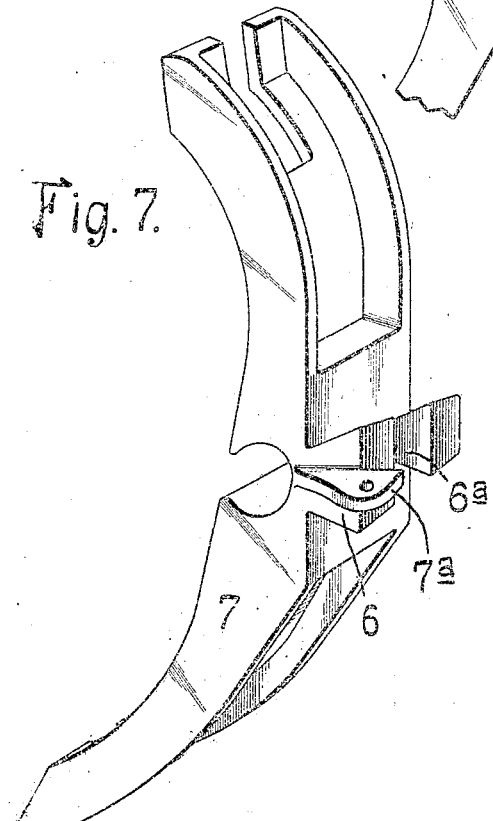
Figure 8:
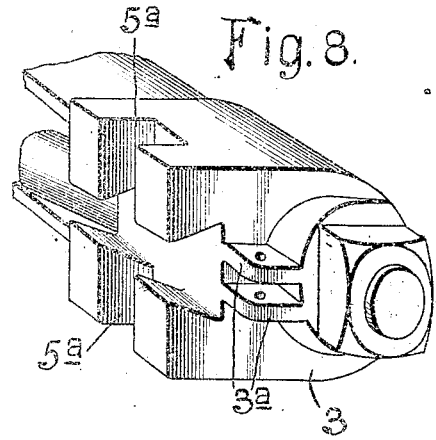

Figure 1 is a rear view of the removable brake-head. Fig. 2 is a front view of the thrust-block. Fig. 3 is a detail view of the wedge-key. Fig. 4 is a sectional view showing the brake-head assembled on the thrust-block. Fig. 5 is a sectional view on line 5 5 of Fig. 4. Fig. 6 is an end elevational view of a modified form of removable brake-head. Fig. 7 is a perspective view of the brake-head, and Fig. 8 is a perspective view of the thrust-block.

This invention relates to a new and useful improvement in brake-beams, the object being to enable the head to be readily and quickly removed in making repairs without necessitating the unhanging of the beam or the disturbance of the integrity of the truss.

With this object in view the invention consists in the construction, arrangement, and combination of the several parts, all as will be hereinafter described, and afterward pointed out in the claims.

In service the brake-shoes, which are carried by the brake-head, being secured in position by a wedge-key passing through the perforated lugs on the front face of the head in a well-known manner, are made removable in order that they may be replaced when worn. Frequently in careless inspection these shoes are permitted to wear down to such an extent that the fastening-lugs are ground off by the wheels until finally the shoes drop out of the head, because of the destruction of the securing means. It is not designed, however, in practice that the securing-lugs for the shoes should be worn, as it is the intention to renew the shoes at frequent intervals, so as to protect the heads. However, when the shoes are ground off and the heads come in direct contact with the wheels it is necessary to renew the heads as well as the shoes; and the principal object of my present invention is to provide a removable brake-head carrying a removable shoe, so that when the brake-head is worn by contact with the wheel so that it no longer affords a proper support for the brake-shoe the head may be removed and a new head substituted.

A well-known type of trussed brake-beam is shown in the accompanying drawings, in which the thrust-block is provided with a socket to receive a horizontally-disposed key on the back of the head. The widest portion of the socket in the thrust-block is at the outer end thereof, so that when it is desired to remove the head the same can be pulled outwardly after the removal of the wedge-key, which is vertically disposed and in the transverse plane with respect to the socket.

In the drawings I have not shown the compression and tension members, as the same may be of usual well-known construction.

3 indicates the thrust-block, in which the end of the compression member is seated and through which the tension-rod may pass, as usual. The front face of this thrust-block is provided with a horizontally-disposed tapered dovetail recess 5, the widest portion being at the outer end, in which fits a locking-wedge 6 on the back of the brake-head 7.

The upper and lower projections on the face of the thrust-block, which form the socket, are provided with alining openings, with which an opening in the locking-wedge 6 is designed to register when the brake-head is in position, and through these registering openings is arranged a wedge-key 8, said wedge-key 8 being provided with a cotter-pin in its lower end to prevent its accidental displacement. If desired, this wedge-key may pass through openings in flanges on the back of the brake-head above and below the thrust-block. Wedge-key 8 is preferably made tapered, so that in practice gravity will cause the same to work down and prevent the brake-head working loose on the thrust-block.

In Figs. 6, 7, and 8 I have illustrated a modified form of my invention, wherein the top and bottom walls of the horizontally-disposed groove in the thrust-block are cut away, as at $5^a$, the locking-wedge 6 on the brake-head being also cut away at the center, as at $6^a$. Perforated lugs or ears $3^a$ are formed on the outer end of the thrust-block, which coöperate with a perforated lug or ear 7ª on the brake-head, a cotter-pin passing through the perforations of said lugs or ears to hold the brake-head in position.

The vertically-disposed recesses in the walls of the socket on the thrust-block and the locking-wedge of the brake-head enable the removal of the head with less horizontal displacement or movement than is necessary with respect to the construction of Figs. 1 to 5, inclusive. In the construction shown in Figs. 1 to 5 to remove the head it is necessary to slide the same horizontally the full width of the head or more—say three and one-half inches. In the modification shown in Figs. 6, 7, and 8, inclusive, the head can be removed by a sliding movement of, say, approximately one and one-eighth inches, or to a position where the recesses on the head aline with the lugs on the thrust-block, when the head can be lifted vertically until disengaged. The advantage of this arrangement is that less room at the end of the brake-beam is required to remove the head. In some trucks there is not enough clearance between the end of the brake-beam and the truck frame or arch-bars to admit of sliding the heads outwardly a distance of three and one-half inches, and consequently this modified arrangement permits of the removal of the head in a more limited space.

Having thus described my invention, what I claim, and desire to secure by Letters Patent, is—

1. In a trussed brake-beam, the combination of a thrust-block and a removable brake-head, one of said parts having a horizontally-disposed tapered socket, and the other of said parts having a horizontally-disposed tapered projection for interlocking with said socket, the taper being so arranged as to permit longitudinal and outward removal of the brake-head, and a vertically-disposed wedge-key for engaging the locking projection in its socket; substantially as described.

2. In a trussed brake-beam, the combination with a thrust-block having a horizontally-disposed tapered socket widest at its outer end, of a removable brake-head having a horizontally-disposed tapered projection thereon for interlocking with said socket, a renewable brake-shoe carried by said brake-head, and a vertically-disposed wedge-key for locking the brake-head in position; substantially as described.

3. The herein-described thrust-block for trussed brake-beams, the same being provided with a horizontally-disposed dovetailing tapered socket for the attachment of a brake-head; substantially as described.

4. The herein-described brake-head for brake-beams, the same being provided with a horizontally-disposed tapered dovetailing projection for attachment to a thrust-block; substantially as described.

5. In a trussed brake-beam, the combination with a thrust-block and brake-head, one of said parts having a horizontally-disposed tapered socket and the other of said parts having a horizontally-disposed tapered projection for interlocking with said socket, said projection and the walls of the socket being recessed for the purposes described; substantially as described.

6. The herein-described thrust-block for trussed brake-beams, the same being provided with a horizontally-disposed tapered socket for the attachment of a brake-head, the walls of said socket being recessed or cut away to provide a vertically-disposed opening; substantially as described.

7. The herein-described brake-head for brake-beams, the same being provided with a horizontally-disposed tapered projection for attachment to a thrust-block, said projection being cut away or recessed at a point between its ends; substantially as described.

In testimony whereof I hereunto affix my signature, in the presence of two witnesses, this 29th day of September, 1905.

HENRY B. ROBISCHUNG.

Witnesses:
E. B. LEIGH,
DAVID S. GEER.